(12) United States Patent
Snover et al.

(10) Patent No.: US 7,818,726 B2
(45) Date of Patent: Oct. 19, 2010

(54) SCRIPT-BASED OBJECT ADAPTATION

(75) Inventors: Jeffrey P. Snover, Woodinville, WA (US); Bruce Gordon Payette, Bellevue, WA (US); Jeffrey Dick Jones, Redmond, WA (US); Kenneth M. Hansen, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1198 days.

(21) Appl. No.: 11/339,654

(22) Filed: Jan. 25, 2006

(65) Prior Publication Data

US 2007/0174821 A1  Jul. 26, 2007

(51) Int. Cl.
*G06F 9/45* (2006.01)

(52) U.S. Cl. .............. 717/139; 717/115; 717/119; 717/149; 717/108; 717/116; 715/248; 715/249

(58) Field of Classification Search ............ 717/108, 717/115, 116, 119, 136, 139, 140, 149, 138; 715/248, 249; 719/329; 709/212
See application file for complete search history.

(56) References Cited

U.S. PATENT DOCUMENTS

| | | | | |
|---|---|---|---|---|
| 5,805,884 | A | | 9/1998 | Sitbon et al. .............. 395/680 |
| 5,884,309 | A | | 3/1999 | Vanechanos, Jr. ........... 707/10 |
| 6,311,320 | B1 | | 10/2001 | Jibbe ........................... 717/1 |
| 6,502,102 | B1 | * | 12/2002 | Haswell et al. ............. 707/102 |
| 6,658,646 | B1 | * | 12/2003 | Hernandez, III ............ 717/115 |
| 6,668,368 | B1 | | 12/2003 | Hernandez, III ............ 717/115 |
| 6,681,386 | B1 | | 1/2004 | Amin et al. ................ 717/136 |
| 6,701,514 | B1 | * | 3/2004 | Haswell et al. ............. 717/115 |
| 6,738,964 | B1 | * | 5/2004 | Zink et al. ................. 717/105 |
| 6,961,930 | B1 | * | 11/2005 | Waldspurger et al. ....... 717/141 |
| 7,458,074 | B2 | * | 11/2008 | Dull et al. ................. 717/169 |
| 7,636,894 | B2 | * | 12/2009 | Vedula et al. .............. 715/763 |
| 2002/0062354 | A1 | * | 5/2002 | Suraski et al. ............. 709/212 |
| 2003/0105958 | A1 | | 6/2003 | McArdle ................... 713/167 |
| 2003/0121024 | A1 | * | 6/2003 | Hill et al. .................. 717/107 |
| 2003/0126147 | A1 | * | 7/2003 | Essafi et al. ............... 707/100 |
| 2003/0182157 | A1 | * | 9/2003 | Valk .............................. 705/1 |
| 2004/0015846 | A1 | * | 1/2004 | Haisraeli .................... 717/115 |
| 2004/0088368 | A1 | | 5/2004 | Burrell ....................... 709/217 |
| 2004/0177349 | A1 | | 9/2004 | Black-Ziegelbein et al. . 717/139 |

(Continued)

FOREIGN PATENT DOCUMENTS

EP  0 701 202 A1  3/1996

OTHER PUBLICATIONS

Title: Object-oriented implementation of an interactive and automatic field-processing surface, Author:De Gersem, Publication Year: 2000, source: IEEE.*

Title:An adaptive object model with dynamic role binding, author: Tamai, T.; Publication Year: 2005, source: IEEE.*

(Continued)

*Primary Examiner*—Chameli C Das
(74) *Attorney, Agent, or Firm*—Workman Nydegger

(57) ABSTRACT

The adaptation of at least a portion of an object provided by a previous script component to a subsequent script component, despite the subsequent component being incapable of recognizing a format of the at least a portion of the object as provided by the previous component. The previous component generates an object having a property. Adaptation script identifies adaptation(s) to perform on the property prior to being used by the subsequent component. The adaptation is performed, and the adapted property is then used by the subsequent component.

18 Claims, 3 Drawing Sheets

U.S. PATENT DOCUMENTS

| | | | |
|---|---|---|---|
| 2005/0004973 A1 | 1/2005 | Snover et al. | 709/200 |
| 2005/0021513 A1* | 1/2005 | Vedula et al. | 707/3 |
| 2005/0091201 A1 | 4/2005 | Snover et al. | 707/3 |
| 2005/0091586 A1* | 4/2005 | Snover et al. | 715/517 |
| 2005/0193269 A1* | 9/2005 | Haswell et al. | 714/38 |
| 2005/0246353 A1* | 11/2005 | Ezer et al. | 707/100 |
| 2007/0033327 A1* | 2/2007 | Sinclair | 711/103 |
| 2007/0135949 A1* | 6/2007 | Snover et al. | 700/86 |
| 2008/0082959 A1* | 4/2008 | Fowler | 717/104 |

OTHER PUBLICATIONS

Wafe-An X Toolkit Based Frontend for Application Programs in Various Programming Languages: Gustaf Neumann & Stefan Nusser, 1992 Winter USENIX-Jan. 25-29, 1993-San Diego CA, p. 1-12.

SLURM: Simple Linux Utility for Resource Management: M. Jette, M. Grondona, Jun. 23, 2003.

Data Generation Techniques for automated Software Robustness Testing (1999). Matthew Schmid & Frank Hill, pp. 1-11.

* cited by examiner

SCRIPT-BASED OBJECT ADAPTATION

BACKGROUND

Background and Relevant Art

Computing systems have revolutionized the way we work and play. Computing systems come in a wide variety of forms including laptop computers, desktop computers, personal digital assistants, telephones, and even devices that have not been conventionally associated with computing systems such as, for example, refrigerators and automobiles. Computing systems may even comprise a number of constituent computing systems interconnected via a network. Thus, some computing systems may be small enough to fit in the palm of the hand, while others are spread over much of the globe.

Regardless of their physical form, computing systems are composed of hardware and software. The hardware includes most fundamentally at least one processor and memory. The software includes instructions that may be embodied in the memory or in storage, and that can be accessed and executed by the processor(s) to direct the overall functionality of the computing system. Thus, software is critical in enabling and directing the functionality of the computing system.

"Script" is a term used to describe one form of software that includes a sequence of commands that may be interpreted to form computer-executable instructions during run-time immediately before the computer-executable instructions are actually executed by the processor(s). Often, the commands will be used to execute specific components referred to herein as "script components". Recently, script components are now capable of being "pipelined". A script "pipeline" is a sequence of script commands where all or part of the output of one command is used as the input of the next command in the pipeline. However, sometimes the subsequent component is not capable of recognizing the needed object or property. In that case, the subsequent component may not be able to perform valuable processing, the accuracy of which depends on a recognition of the property.

BRIEF SUMMARY

Embodiments of the present invention relate to the adaptation of at least a portion of an object provided by a previous script component to a subsequent script component, despite the subsequent component being incapable of recognizing a format of at least a portion of the object as provided by the previous component. The previous component generates an object having a property. Adaptation script identifies adaptation(s) to perform on the property prior to being used by the subsequent component. The adaptation is performed, and the adapted property is used by the subsequent component.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to the adaptation of at least a portion of an object provided by a previous script component to a subsequent script component. First, an example computing system in which the principles of the present invention may operate will be described with respect to FIG. 1. Then, the principles of the present invention will be described in further detail with respect to the subsequent Figures. The embodiments of the present invention may comprise a special purpose or general-purpose computer including various computer hardware, as discussed in greater detail below.

Figure 1:
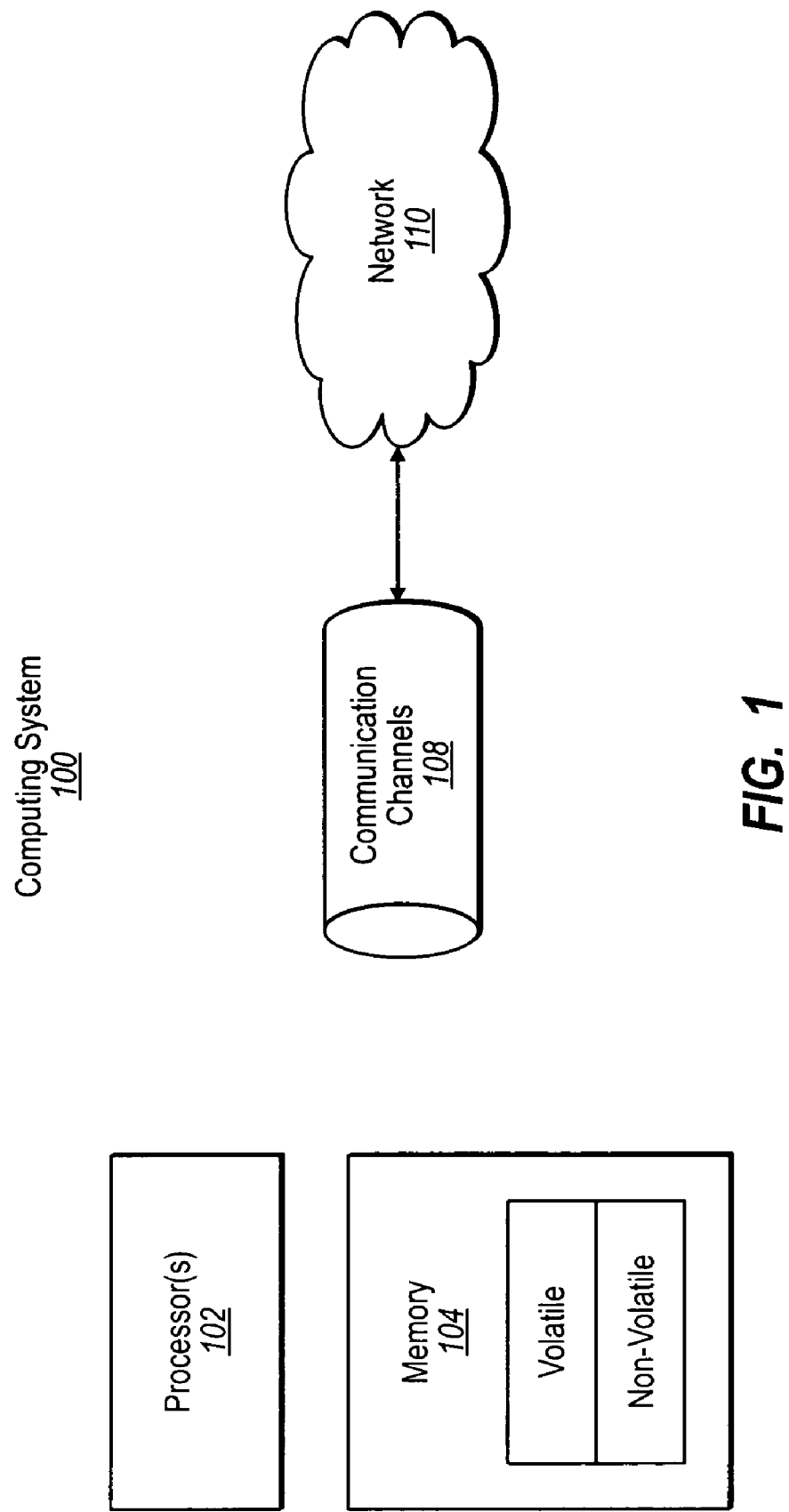
FIG. 1 illustrates a suitable computing environment in which the principles of the present invention may be employed.

FIG. 1 shows a schematic diagram of an example computing system 100 that may be used to implement features of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide variety of forms. Computing systems may, for example, be handheld devices, appliances, laptop computers, desktop computers, mainframes, or distributed computing systems. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be volatile, non-volatile, or some combination of the two, and represents one or more physical computer-readable media. An example of volatile memory includes Random Access Memory (RAM). Examples of non-volatile memory include Read Only Memory (ROM), flash memory, or the like. The term "memory" may also be used herein to refer to non-volatile mass storage. Such storage may be removable or non-removable, and may include (but is not limited to) PCMCIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads) as part of a protocol. While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Figure 2:
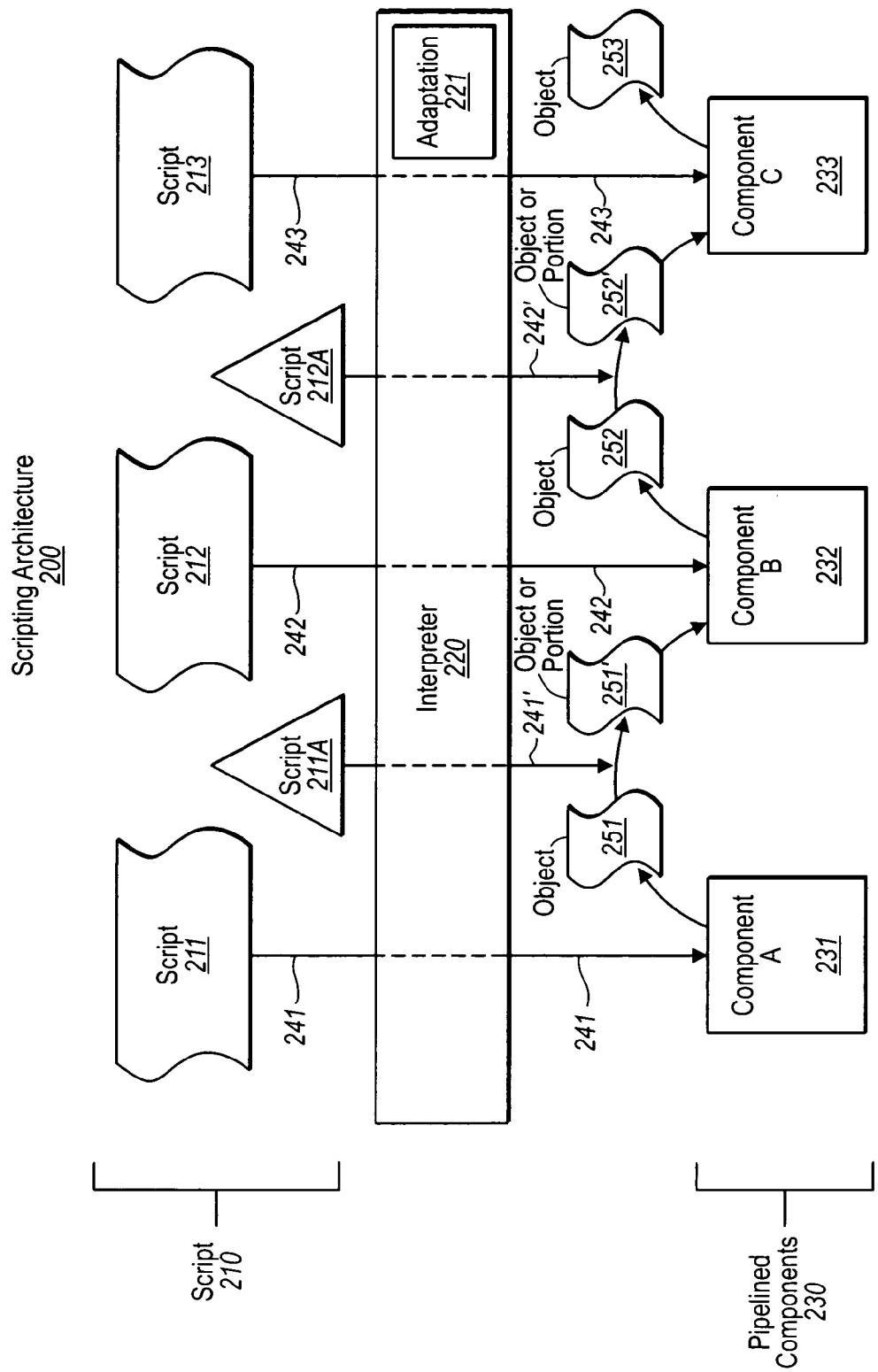
FIG. 2 illustrates a scripting architecture that represents a computing environment in which an interpreter interprets script to formulate a plurality of pipelined scripting components in accordance with one aspect of the principles of the present invention.

FIG. 2 illustrates a scripting architecture 200 that represents a computing environment in which an interpreter interprets script to formulate a plurality of pipelined scripting components. When implemented in the computing system 100, for example, some of all of the scripting architecture 200 may be instantiated in the system memory of the computing system 100 (e.g., "Volatile" in memory 104) upon executing computer-executable instructions (e.g., from "Volatile" in memory 104 and/or from "Non-Volatile" in memory 104).

The scripting architecture 200 of FIG. 2 includes an interpreter 220 that is configured to interpret script (represented generally as 210). In the illustrated example, the script 210 includes script portions 211, 211A, 212, 212A and 213, which are provided by way of example only to illustrate aspects of the principles of the present invention. The interpreter 220 is configured to formulate pipelined script components 230. In the example, the interpretation of script portion 211 causes the interpreter 220 to instantiate the component 231 as represented by the arrow 241, the interpretation of script portion 212 causes the interpreter 220 to instantiate the component 232 as represented by the arrow 242, and the interpretation of script portion 213 causes the interpreter 220 to instantiate the component 233 as represented by the arrow 243. The script 211, 212, and 213 may each be a script command line, multiple script command lines and/or perhaps even just a portion of one or more command lines. For instance, in one embodiment, all of script portions 211, 212, and 213 are included within a single pipeline command. In that case, the script components 211A and 212A may also be included within that single pipeline command.

Each of the components 230 are configured to generate an object. For instance, component 231 generates object 251, component 232 generates object 252, and component 233 generates object 253. Each object may be an instance of and derived from an object class and include one or more properties and zero or more callable methods in accordance with classic object-oriented programming, although that is not required.

The components are "pipelined" in the sense that in order to generate an object, the component may need an object or a portion thereof (e.g., a property) that was generated by the prior component in the pipelined components in order to generate its own object. For instance, component 232 may need information from object 251 generated by component 231 in order generate its own object 252. Likewise, component 233 may need information from object 252 generated by component 232 in order to generate its own object 253. Nevertheless, the information generated by the prior component may not be in a form that is recognized or helpful to the subsequent component.

Accordingly, in accordance with the principles of the present invention, the script 210 includes adaptation script that identifies one or more adaptations to be performed on the object generated by the prior component in the pipeline. The adaptation script, when interpreted by the interpreter 220, causes appropriate modifications to be made to the object or component(s) thereof to thereby accomplish the one or more adaptations. For instance, the adaptation script 211A may be interpreted by interpreter 220 to cause information 251' to be derived from the object 251 as represented by arrow 241'. Such an adaptation may be performed by an adaptation component 221 of the interpreter although that is not required. The adapted information 251' is then in a useful form to be consumed by the component 252. Likewise, adaptation script 212A may be interpreted by interpreter 220 to cause information 252' to be derived from the object 252 as represented by arrow 242'. This adaptation may also be performed by the adaptation component 221 although not required.

For instance, consider the following script:

C1|C2-LastModifiedDate {$_.ModifiedDate}

Although any script syntax and semantics will suffice so long as an interpreter may be built around that script syntax and semantics, the above represents a simple example of one possible design for how such adaptation may be specified in a simple script string. In this example "C1" represents a command that could be interpreted to invoke a first of two components in the script pipeline, whereas "C2" represents a command that could be interpreted to invoke the second of the two components in the script pipeline.

Suppose that the object provided by C1 includes a "ModifiedDate" Field, whereas the component C2 expects the field to be named "LastModifiedDate". If this property is important for the component C2 in using the object generated by the component C1, then the component C2 may not be able to complete its processing. Accordingly, the script includes some adaptation code, which is in this case, "-LastModifiedDate {$_.ModifiedDate}", which causes the interpreter to map these two fields, and perhaps even modify the object generated by C1 to include the field "LastModifiedDate" instead of "ModifiedDate". Accordingly, the principles of the present invention allow for pipelined script components to work together even when objects generated by a prior component in the pipelined components are not immediately compatible for consumption by subsequent components in the pipeline.

Figure 3:
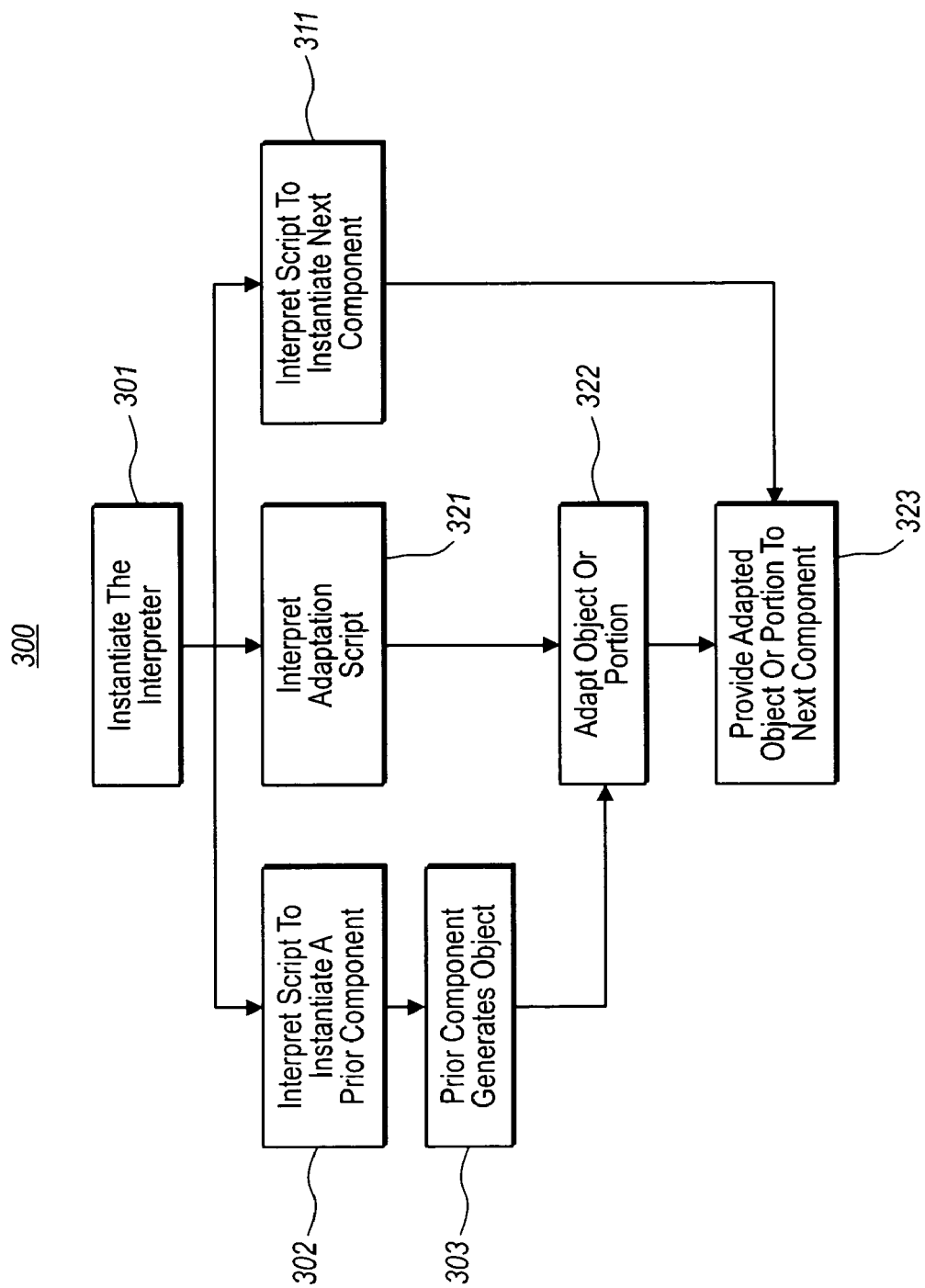
FIG. 3 illustrates a flowchart of a method for a subsequent component of pipelined components using information provided in at least a portion of an object provided by a previous component in accordance with one aspect of the principles of the present invention.

FIG. 3 illustrates a flowchart of a method 300 for a subsequent component of pipelined components using information provided in at least a portion of an object provided by a previous component, despite the subsequent component being incapable of recognizing a format of the at least a portion of the object as provided by the previous component. The method 300 may be performed by the interpreter 220 of FIG. 2 in the example of FIG. 2. Accordingly, the method 300 will be described with frequent reference to the scripting architecture example 200 of FIG. 2.

If the interpreter has not already been instantiated in system memory, the interpreter is instantiated (act 301). In FIG. 2, for example, the interpreter 220 may be instantiated in system memory such as memory 104 of FIG. 1.

The interpreter then interprets script to instantiate a previous component in a pipeline of script components (act 302). Referring to FIG. 2, the method 300 may first be performed with the component A being the previous component and the component B being a subsequent component. In FIG. 2, for example, the interpreter 220 interprets script 211 to instantiate component A.

During processing, the previous component generates an object having a property (act 303). In FIG. 2, for example, component A generates object 251, which may have a property. The object may be an object in accordance with object-oriented programs and thus may include one or more properties and zero or more callable methods. The object may be derived from a class.

The interpreter then interprets script to instantiate the subsequent component (act 311). In FIG. 2, for example, the interpreter 220 interprets script 212 to instantiate component B. As previously mentioned, the interpreter may also interpret adaptation script to allow appropriate adaptations to be performed on the object or portions thereof (e.g., one or more properties) in order to allow that object or object portion to be used as input for the next component. This adaptation is represented by acts 321, 322, and 323, which may be potentially be performed for multiple objects generated by the prior component, and/or may be performed for multiple portions (e.g., multiple properties) whether within a single object or spanning multiple objects.

Referring to FIG. 3, the interpreter interprets adaptation script that identifies one or more adaptations to perform on the property (act 321). For instance, in the example above, one adaptation was to perform a property name mapping of ModifiedDate to LastModifiedDate. There may be other mapping or adaptations for other properties from that object.

The adaptation(s) identified by the script are then performed on the property in (act 322). The adaptation(s) may be performed to the object upon being generated by the previous component (e.g., at the output side of the previous component) or the one or more adaptations are performed on the property just prior to being provided to the subsequent component (e.g., to the input side of the subsequent component). In FIG. 2, the interpreter 220 interprets adaptation script 211A to cause object or portion 251' to be derived from object 251.

The adapted property is then provided as input to the subsequent component (act 323). In FIG. 2, for example, the adapted object or portion 251' is provided to component B. The method may be repeated as desired. For instance, in FIG. 2, the method may be repeated while treating component B as the previous component and component C as the subsequent component as previous described. The adaptations performed to the object 252 may be the same as or different than the adaptations performed to the object 251. The adaptations may depend on the unique characteristics of the object generated by the prior component, and depend on what information and structure the next components depends on in using the object.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment in which an interpreter interprets script to formulate a plurality of pipelined components, a method for a subsequent component in the plurality of pipelined components using information provided in at least a portion of an object provided by a previous component in the plurality of pipelined components, despite the subsequent component being incapable of recognizing a format of the at least a portion of the object as provided by the previous component, the method comprising:

interpreting a first script and instantiating the previous component;

the previous component generating an object having a property, the property having been generated by the previous component as a result of interpreting the first script;

interpreting a second script and instantiating the subsequent component;

interpreting an adaptation script and identifying one or more adaptations to perform on the property of the generated object from the previous component;

performing the one or more adaptations on the property of the generated object in response to interpreting the adaptation script; and providing the adapted property as input to the subsequent component.

2. A method in accordance with claim 1, wherein the property of the object is a first property of the object, the adaptation script is first adaptation script and the one or more adaptations are first one or more adaptations, the method further comprising:

interpreting second adaptation script that identifies second one or more adaptations to perform on a second property of the of the generated object;

performing the second one or more adaptations on the second property in response to interpreting the second adaptation script; and providing the second adapted property as input to the subsequent component.

3. A method in accordance with claim 1, wherein the one or more adaptations are performed to the object upon being generated by the previous component.

4. A method in accordance with claim 1, wherein the one or more adaptations are performed on the property of the generated object from the previous component just prior to being provided to the subsequent component.

5. A method in accordance with claim 1, wherein previous component is a first previous component, the subsequent component is a first subsequent component and a second previous component, the adaptation script is first adaptation script, the one or more adaptations are first one or more adaptations, the object is a first object, and the property is a first property, the method further comprising:

the second previous component generating a second object having a second property;

interpreting script to instantiate a second subsequent component;

interpreting second adaptation script that identifies second one or more adaptations to perform on the second property;

performing the second one or more adaptations on the second property in response to interpreting the second adaptation script; and providing the adapted second property as input to the second subsequent component.

6. A method in accordance with claim 5, wherein the second one or more adaptations are the same as the first one or more adaptations.

7. A method in accordance with claim 6, wherein the first adaptation script is the same as the second adaptation script.

8. A method in accordance with claim 1, wherein the one or more adaptations includes at least changing a name of the property.

9. A method in accordance with claim 1, wherein the object includes one or more associated callable methods.

10. A computer program product comprising one or more computer-readable storage media having thereon computer-executable instructions that, upon execution by one or more processors of a computing system, cause the computing system to perform:

instantiating in system memory an interpreter configured to perform a method comprising the following when interpreting script that represents a previous component and a subsequent component in a plurality of pipelined components, the script also including an adaptation script that identifies one or more adaptations to perform on a property of an object provided to the subsequent component by the previous component:

instantiating the previous component;

causing the previous component to generate an object having a property;

instantiating the subsequent component;

interpreting the adaptation script;

performing the one or more adaptations on the property of the generated object from the previous component in response to interpreting the adaptation script; and providing the adapted property as input to the subsequent component.

11. A computer program product in accordance with claim 10, wherein the one or more adaptations are performed to the object upon being generated by the previous component.

12. A computer program product in accordance with claim 10, wherein the one or more adaptations are performed on the property of the generated object from the previous component just prior to being provided to the subsequent component.

13. A computer program product in accordance with claim 10, wherein the interpreter is configured to perform the method for multiple combinations of previous and subsequent components in the plurality of pipelined components.

14. A computer program product in accordance with claim 10, wherein the one or more adaptations includes at least changing a name of the property of the generated object from the previous component.

15. A computer program product in accordance with claim 10, wherein the object includes one or more associated callable methods.

16. A computing system comprising:

one or more processors;

system memory;

one or more physical computer-readable storage media having thereon computer-executable instructions that, upon execution by the one or more processors, causes the computing system to instantiate in the system memory an interpreter configured to perform a method comprising the following when interpreting script that represents a previous component and a subsequent component in a plurality of pipelined components, the script also including an adaptation script that identifies one or more adaptations to perform on a property of an object provided to the subsequent component by the previous component:

instantiating the previous component;

causing the previous component to generate an object having a property;

instantiating the subsequent component;

interpreting the adaptation script;

performing the one or more adaptations on the property of the generated object from the previous component in response to interpreting the adaptation script; and providing the adapted property as input to the subsequent component.

17. A computing system in accordance with claim 16, wherein the one or more adaptations includes at least changing a name of the property of the generated object from the previous component.

18. A computing system in accordance with claim 16, wherein the object includes one or more associated callable methods.

* * * * *

UNITED STATES PATENT AND TRADEMARK OFFICE
CERTIFICATE OF CORRECTION

| | | |
|---|---|---|
| PATENT NO. | : 7,818,726 B2 | Page 1 of 1 |
| APPLICATION NO. | : 11/339654 | |
| DATED | : October 19, 2010 | |
| INVENTOR(S) | : Jeffrey P. Snover et al. | |

It is certified that error appears in the above-identified patent and that said Letters Patent is hereby corrected as shown below:

In column 7, line 6, in Claim 2, delete "of the of the" and insert -- of the --, therefor.

Signed and Sealed this
First Day of February, 2011

David J. Kappos
*Director of the United States Patent and Trademark Office*